United States Patent Office 3,433,822
Patented Mar. 18, 1969

3,433,822
PROCESS FOR THE PRODUCTION OF
ACRYLONITRILE
Arnold Hausweiler, Dormagen, and Bernhard Scherhag, Leverkusen, Germany, assignors to Farbenfabriken Bayer Aktiengesellschaft, Leverkusen, Germany, a corporation of Germany
No Drawing. Filed Aug. 4, 1965, Ser. No. 477,285
Claims priority, application Germany, Aug. 14, 1964, F 43,757
U.S. Cl. 260—465.3     5 Claims
Int. Cl. C07c 121/02, 121/32

ABSTRACT OF THE DISCLOSURE

A process of treating the gas mixture produced in the synthesis of acrylonitrile by the catalytic oxidation of propylene in the presence of ammonia and oxygen for the separation therefrom of high boiling by-products produced in the reaction. The process involves subjecting the synthesis gas mixture to a scrubbing treatment with water having a temperature of from 70 to about 90° C. whereby the aforesaid secondary reaction products, i.e., polymers of hydrocyanic acid, polymers of acrylonitrile, acrylic acid and acrolein, etc., are absorbed into the wash water, the acrylonitrile and other low boiling materials remaining in the synthesis gas. The process has the advantage that substantially no acrylonitrile is lost and furthermore the high boiling compounds which disturb the further processing are eliminated.

---

The present invention is concerned with a process for the production of acrylonitrile.

In the production of acrylonitrile from propylene and ammonia by oxidation with oxygen in the presence of catalysts there are obtained hydrocyanic acid, acetonitrile and $C_2$ and $C_3$ aldehydes as important by-products. These by-products can react with one another or with acrylonitrile, in the reaction chamber or during the working up of the gaseous reaction products, to give high boiling compounds which disturb the further working up. These reactions are further promoted by the ammonia always present in the reaction gas.

Such secondary products are, for example, polymers of hydrocyanic acid, polymers of acrylonitrile, acrylic acid and acrolein, pyridine bases which may be formed by the aldehydes and ammonia and compounds which are derived by the reaction of ammonia with acrylonitrile, hydrocyanic acid, acrylic acid and their polymers.

In the course of working up, the reaction gases leaving the reactor can first be washed with aqueous solutions of acids, preferably sulphuric acid, for the removal of unreacted ammonia, and the reaction products are then removed from the gas by washing with water. According to other processes, all the reaction products are taken up in water at temperatures between 10 and 30° C., together with the ammonia, and separated by extractive distillation. The above-mentioned high boiling by-products resulting from secondary reactions are either absorbed in the wash with sulphuric acid or in the wash with water, where they cause very troublesome foam formations and blockings of the column parts, and finally remain in the ammonium sulphate or in the waste water from the extractive distillation.

When the position of the production plant does not permit the aqueous wastes containing ammonium sulphate and organic by-products to flow into the earth or into a large expanse of water, then, in the first case, a contaminated ammonium sulphate cannot be avoided, and in the second case, the waste water from the extractive distillation has to be purified in an expensive process step.

We have now found that the reaction gases formed in the production of acrylonitrile by the reaction of propylene, ammonia and oxygen in the presence of catalysts can be worked up in an especially advantageous manner when the gaseous reaction mixture formed in the production of acrylonitrile is subjected to a water wash at temperatures substantially between 70 to 100° C.

In the process according to the present invention, the high boiling and polymeric accompanying materials are taken up by the water, whereas the monomeric reactions products, such as acrylonitrile, hydrocyanic acid and acetonitrile, remain in the reaction gas. The gas to be used is expediently previously cooled to temperatures within the range of between 70 to 170° C.

In the process according to the present invention, the wash water is preferably circulated and it is expedient to work in such a manner that a sump product is obtained which contains the high boiling, organic compounds as a 15 to 35% solution or slurry. Corresponding to the amount of high boiling, organic compounds obtained, corresponding amounts of wash water are continuously or partially continuously removed. The working up of these aqueous solutions can be carried out in various ways, depending on the local conditions. In the case of high concentrations of organic compounds, the aqueous solution can be introduced directly into a combustion oven. The calorific value is so high that the supply of fuel oil or fuel gas for evaporation of the water is unnecessary.

If a working up of this type is not possible, the 15 to 35% aqueous solution or slurry can be acidified, for example, to a pH of 5 to 6. A considerable precipitation of products thereby takes place, which can be filtered off and subsequently burnt. In general, 50 to 75% of the organic compounds can be removed in this way. The remaining solution can then be recycled, for example, as wash water.

If the reaction products contain dust particles, which result from abrasion of the catalysts, these dust particles are also removed by the wash process used according to the present invention.

A special advantage of the process according to the present invention is the fact that the high boiling by-products can be removed in the form of a concentrated aqueous solution or slurry before the working up of the reaction gas and no longer interfere with the subsequent process steps by foam formation or contamination of the ammonium sulphate and waste water.

It was surprising and not to be foreseen that the purification of the reaction gas according to the present invention by a hot water wash in the presence of considerable amounts of ammonia can be carried out with only very small losses of acrylonitrile and hydrocyanic acid since, because of the known and feared tendency of acrylonitrile and hydrocyanic acid to rapidly proceeding side reactions with ammonia in aqueous solution, considerable losses of nitriles were to be expected with this method of procedure.

The following examples are given for the purpose of illustrating the present invention:

EXAMPLE 1

50,000 $m.^3$ (N.T.P.) reaction gas of a process for the production of acrylonitrile by the reaction of propylene with oxygen and ammonia in the presence of a catalyst, which contains at most 2 volume percent ammonia, 2.0 volume percent oxygen, 4.5 volume percent acrylonitrile, 2 volume percent hydrocyanic acid and 30 to 45 volume percent steam, besides nitrogen, propylene, carbon monoxide, carbon dioxide and, acetonitrile, are cooled to 100 to 170° C. in a tube cooler (gas through the tubes) supplied with water at temperatures above 90° C. High boiling, greasy compounds, which are condensed out of the reaction gas, deposit on the inner walls of the cooling tubes. The reaction gas is then passed to the suction side of a jet washing device in which 300 to 500 m.$^3$ water at 75 to 85° C. are circulated per hour and sprayed through nozzles into the gas chamber. The volume of liquid in the sump of the jet washer is 10 to 15 m.$^3$ In the wash water circulation there is situated a cooler by means of which the temperature of the washing liquid can be so controlled that the heat of the gas is removed from the reaction gas without evaporation and that, in addition, any amount of water between 0.5 and 2 metric tons per hour can be condensed out of the gas. The temperature of the wash liquid is thus maintained somewhat below the dew point temperature of the gas. In the mono- or multi-stage washing of the reaction gas in the jet washer, the above-mentioned organic compounds resulting from secondary reactions are taken up by the water. At the same time, such an amount of water is condensed out of the gas that the organic compounds, without alteration of the volume of the jet sump, can be removed as 15 to 35% solutions or slurries.

Furthermore, the liquid from the sump of the jet is used for washing out from time to time the organic deposits on the cooling tubes of the connected tube cooler by spraying this liquid into the head of the standing cooler, allowing liquid and reaction gas to flow together through the tubes and returning the liquid charged with contaminating materials to the sump, from where it is discharged, if desired.

With the liquid in the sump of the jet, there are withdrawn hourly, besides the high boiling by-products removed from the gas and the connected cooler, 2 to 3 kg. acrylonitrile and 1 to 2 kg. hydrocyanic acid, in monomeric or polymeric form. Consequently, the loss of these compounds in the wash process according to the present invention is about 0.1% of the amount contained in the recation gas.

When carrying out the described wash process at gas and liquid temperatures of 63 to 65° C., the loss of acrylonitrile and hydrocyanic acid by polymerization and discharging with the wash water increases to 0.5% each of the total amount, while the degree of purification of the gas remains the same.

Besides jet washers, the wash process described above can also be carried out, for example, in immersion washers.

EXAMPLE 2

500 m.$^3$ (N.T.P.) reaction gas of a process for the production of acrylonitrile by the reaction of propylene with oxygen and ammonia, which contains 1 volume percent ammonia, 2 volume percent oxygen, 5.2 volume percent acrylonitrile, 1.2 volume percent hydrocyanic acid and about 30 volume percent steam, as well as organic polymers, is supplied at 230° C. to the suction side of a jet washer in which 3 to 5 m.$^3$ water at 70 to 77° C. are circulated per hour and sprayed through nozzles into the gas chamber. In the circulation of the wash water, there is situated a cooler by means of which the temperature of the wash liquid can be so controlled that the heat of the gas can be removed from the gas without evaporation and that also water can be condensed out of the gas. During the washing of the gas in the jet washer, the organic by-products are taken up by the water. The loss of acrylonitrile and hydrocyanic acid in the wash process according to the present invention is about 0.3% of the amount contained in the reaction gas.

We claim:
1. A process of separating high boiling and polymeric by-products from a gas mixture produced in the synthesis of acrylonitrile and containing acrylonitrile by the catalytic oxidation of propylene in the presence of ammonia and oxygen, hydrocyanic acid, ammonia, acetonitrile and said high boiling and polymeric by-products, which comprises subjecting such synthesis gas mixture to a scrubbing treatment with water, said water having a temperature of from about 70 to about 90° C. and maintaining the temperature in said scrubbing treatment within the range of about 70 to about 90° C. whereby there is absorbed into the water all of the high boiling and polymeric by-products formed in the synthesis.

2. Process according to claim 1 wherein the scrubbing water is recycled in order to obtain a sump containing high boiling organic compounds formed as by-products in the synthesis in a concentration of 15 to 35%.

3. Process according to claim 2 which comprises pre-cooling said synthesis gas prior to said scrubbing to a temperature of about 70–170° C.

4. Process according to claim 1 wherein said water has a temperature of 75 to 85° C.

5. Process according to claim 1 wherein said water has a temperature of 70 to 77° C.

References Cited

UNITED STATES PATENTS

| | | | |
|---|---|---|---|
| 3,005,517 | 10/1961 | Idol et al. | 260—465.3 |
| 3,210,399 | 10/1965 | Krzemicki | 260—465.3 |
| 3,309,394 | 3/1967 | Hausweiler et al. | 260—465.3 |
| 3,321,411 | 5/1967 | Young et al. | 260—465.3 |

JOSEPH P. BRUST, *Primary Examiner.*

U.S. Cl. X.R.

260—465.9